US009525164B1

(12) United States Patent
Aksu et al.

(10) Patent No.: US 9,525,164 B1
(45) Date of Patent: Dec. 20, 2016

(54) METHOD OF REDUCING VANADIUM PENTOXIDE TO VANADIUM(III) OXIDE

(71) Applicant: King Abdulaziz University, Jeddah (SA)

(72) Inventors: Mecit Aksu, Duzce (TR); Omar Ali Al-Zain, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 15/142,965

(22) Filed: Apr. 29, 2016

(51) Int. Cl.
| B05D 5/00 | (2006.01) |
| B05D 5/12 | (2006.01) |
| C01G 31/00 | (2006.01) |
| C01G 31/02 | (2006.01) |
| H01M 4/04 | (2006.01) |
| H01M 4/139 | (2010.01) |
| H01M 4/70 | (2006.01) |
| H01M 4/66 | (2006.01) |
| H01M 4/02 | (2006.01) |

(52) U.S. Cl.
CPC ............ *H01M 4/0497* (2013.01); *C01G 31/02* (2013.01); *H01M 4/0404* (2013.01); *H01M 4/0416* (2013.01); *H01M 4/139* (2013.01); *H01M 4/661* (2013.01); *H01M 4/70* (2013.01); *C01P 2006/40* (2013.01); *H01M 2004/028* (2013.01)

(58) Field of Classification Search
None
See application file for complete search history.

(56) References Cited

FOREIGN PATENT DOCUMENTS

| CN | 103043721 B | 8/2014 |
| JP | 10125345 A | 5/1998 |
| JP | 3525231 B2 | 5/2004 |
| KR | 2014 0017191 | * 11/2014 |
| WO | 2014/140700 A1 | 9/2014 |

OTHER PUBLICATIONS

Andreev, F.I., et al., "Interaction of V 20 5 with NaBH4 or KBH4 on Heating", Russian Journal of Inorganic Chemistry, vol. 23, No. 10, 3 Pages total, (1978).

* cited by examiner

*Primary Examiner* — Lisha Jiang
(74) *Attorney, Agent, or Firm* — Oblon, McClelland, Maier & Neustadt, L.L.P.

(57) ABSTRACT

A method for producing pure vanadium(III) oxide and a vanadyl sulfate solution comprising contacting vanadium pentoxide with a solid inorganic reducing agent. The resultant mixture containing a mix of vanadium oxides is leached with sulfuric acid to form vanadium(III) oxide and vanadyl sulfate.

19 Claims, 4 Drawing Sheets

METHOD OF REDUCING VANADIUM PENTOXIDE TO VANADIUM(III) OXIDE

BACKGROUND

Field of the Disclosure

This disclosure is directed to a method of reducing vanadium pentoxide to vanadium(III) oxide employing solid inorganic reducing agents. This disclosure is also directed to an electrode comprising the vanadium(III) oxide and an electrochemical cell or battery comprising the electrode.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Transition metal oxides have been studied and applied in areas that span photocatalysis, magnetism, conductivity and superconductivity, and ferroelectricity (Wang et al. Nature Materials, 2003, 2, 402; Law et al, Nature Materials, 2005, 4, 455; Rodriguez et al. Science, 2007, 318, 1757—each incorporated herein by reference in its entirety). Vanadium oxides, $VO_x$, in which the vanadium ion exists in a range of oxidation states from +2 to +5, have been the focus recently because of their potential in optical switching devices, sensors, catalysts, electrochemical devices and high-energy lithium batteries (Wang et al. Chemistry of Materials, 2006, 18, 2787; Kondratenko et al. Applied Catalysis A, 2007, 319, 98—each incorporated herein by reference in its entirety). For instance, vanadium pentoxide ($V_2O_5$) offers a theoretical capacity of 442 mAh $g^{-1}$, which is higher than those of the commercial cathode materials presently used (Cao et al, Angewandte Chemie, 2005, 117, 4465—incorporated herein by reference in its entirety). Vanadium(III) oxide ($V_2O_3$) also offers a high specific capacity (1070 mAh $g^1$) but there are limited studies on vanadium(III) oxide because it is challenging to obtain pure vanadium(III) oxide (Li et al. Journal of the Electrochemical Society, 2004, 151, A1878—incorporated herein by reference in its entirety). When vanadium pentoxide is reduced to vanadium(III) oxide, many unwanted lower valent vanadium oxides are formed. Vanadyl sulfate ($VOSO_4$) solution, an electrolyte for vanadium flow batteries, is formed by treating vanadium pentoxide with sulfuric acid. The disadvantages of this method are: the process is hazardous because the reaction is endothermic and requires heating a corrosive acidic solution, and the vanadyl sulfate solution often contains suspended impurities, such as other vanadium oxides, which are hard to remove.

Hausen et al. (U.S. Pat. No. 3,410,652) disclosed a process for producing vanadium(III) oxide from ammonium metavanadate. More specifically, the reference relates to a continuous process for thermally reducing ammonium metavanadate in an atmosphere of hydrogen in a temperature ranging from 580-950° C.

Dormehl et al. (U.S. Pat. No. 7,073,774) disclosed a process for producing a vanadyl sulfate solution. A suspension of vanadium(III) oxide is formed in sulfuric acid and a strong oxidizing agent is added to the vanadium(III) oxide suspension to produce the vanadyl sulfate solution.

Kazacos et al. (U.S. Pat. No. 7,078,123) disclosed a high energy density (HED) electrolyte solution for use in an all-vanadium redox cell. The solution contains a 50:50 ratio of trivalent and tetravalent vanadium ions and stabilizing compounds such as inorganic phosphates and ammonium compounds.

In view of the foregoing, the objective of the present disclosure is provide a method for producing pure crystalline vanadium(III) oxide for applications such as storage materials, resistive materials, magnetic and optical switches and gas sensors.

SUMMARY OF THE DISCLOSURE

According to a first aspect, the present disclosure relates to a method for producing vanadium(III) oxide, comprising: (i) reacting solid vanadium pentoxide with a solid inorganic reducing agent to form a mixture, (ii) mixing sulfuric acid with the mixture to form a suspension comprising vanadium (III) oxide and vanadyl sulfate, and (iii) filtering the suspension to obtain solid vanadium(III) oxide and a solution of vanadyl sulfate.

In one embodiment, the solid vanadium pentoxide and the solid inorganic reducing agent are reacted in the absence of solvent.

In one embodiment, the reacting comprises heating for 10-20 hours at a temperature ranging from 300° C. to less than 400° C.

In one embodiment, the reacting comprises mixing the solid vanadium pentoxide with the solid inorganic reducing agent, followed by heating for 10-20 hours at a temperature ranging from 300° C. to less than 400° C.

In one embodiment, the reducing agent comprises a borohydride anion or a derivative thereof.

In one embodiment, the reducing agent is at least one of sodium borohydride and potassium borohydride.

In one embodiment, the reducing agent is sodium borohydride.

In one embodiment, a molar ratio of vanadium pentoxide to a total number of hydrogen atoms in the reducing agent ranges from 1:4 to 1:20.

In one embodiment, a molar ratio of vanadium pentoxide to a total number of hydrogen atoms in the reducing agent is about 1:8.

In one embodiment, the sulfuric acid has a concentration ranging from 6-18 M.

In one embodiment, the mixing is carried out at a temperature ranging from 15-30° C.

In one embodiment, the sulfuric acid and the mixture are mixed by sonication or stirring.

In one embodiment, the method of the first aspect further comprises cooling the mixture to a temperature ranging from −10° C. to 5° C. prior to the mixing to form a cooled mixture.

In one embodiment, the method of the first aspect further comprises allowing the suspension to stand for 4-10 hours prior to the filtering.

In one embodiment, the reacting comprises heating for 10 hours at a temperature ranging from 300° C. to less than 330° C.

In one embodiment, the method produces solid vanadium (III) oxide with a purity of at least 95%.

According to a second aspect, the present disclosure relates to a method for producing vanadium(III) oxide, comprising: (i) reacting solid vanadium pentoxide with a solid inorganic reducing agent comprising a borohydride anion or a derivative thereof to form a mixture, (ii) mixing sulfuric acid with the mixture to form a suspension comprising vanadium(III) oxide and vanadyl sulfate, and (iii)

filtering the suspension to obtain solid vanadium(III) oxide and a solution of vanadyl sulfate.

According to a third aspect, the disclosure relates to a method for making an electrode, comprising: (i) reacting solid vanadium pentoxide with a solid inorganic reducing agent to form a mixture, (ii) mixing sulfuric acid with the mixture to form a suspension comprising vanadium(III) oxide and vanadyl sulfate, (iii) filtering the suspension to obtain solid vanadium(III) oxide and a solution of vanadyl sulfate, (iv) mixing the solid vanadium(III) oxide with a polymer and an electroconductive carbon material to form a slurry, (v) coating the slurry onto a metal foil, and (vi) drying the coating to form the electrode.

In one embodiment, the slurry is coated on the metal foil with a roll coater.

The foregoing description is intended to provide a general introduction and summary of the present disclosure and is not intended to be limiting in its disclosure unless otherwise explicitly stated. The presently preferred embodiments, together with further advantages, will be best understood by reference to the following detailed description taken in conjunction with the accompanying drawings.

DETAILED DESCRIPTION OF THE DISCLOSURE

Figure 1:
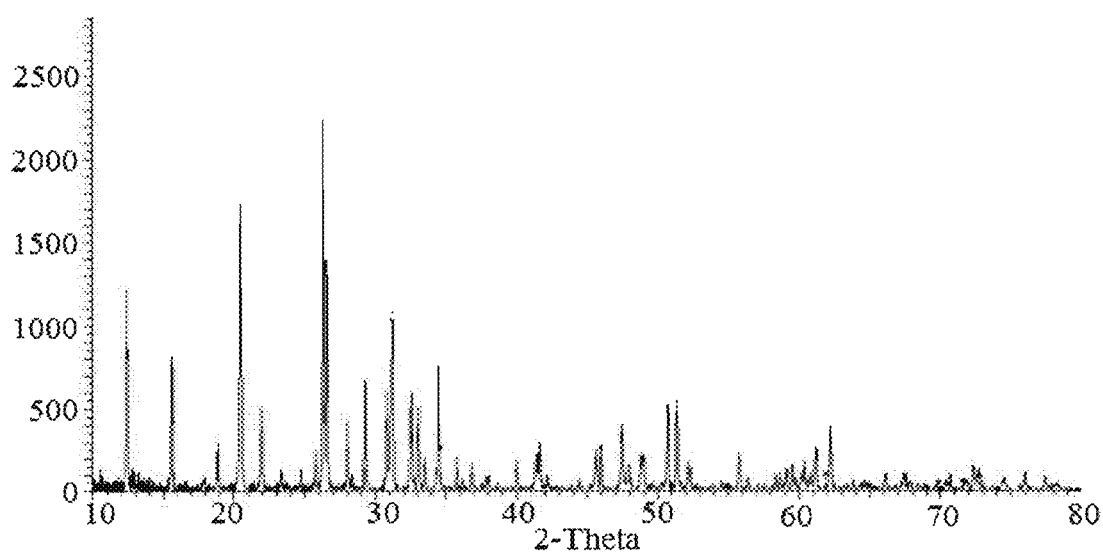
FIG. 1 is a X-ray diffraction (XRD) spectrum which indicates the presence of $NaV_2O_5$ and vanadium(III) oxide after reacting vanadium pentoxide with sodium borohydride as described in the Example.

Embodiments of the present disclosure will now be described more fully hereinafter with reference to the accompanying drawings, in which some, but not all embodiments of the disclosure are shown.

According to the first aspect, the present disclosure relates to a method for producing vanadium(III) oxide, comprising: (i) reacting solid vanadium pentoxide with a solid inorganic reducing agent to form a mixture, (ii) mixing sulfuric acid with the mixture to form a suspension comprising vanadium (III) oxide and vanadyl sulfate, and (iii) filtering the suspension to obtain solid vanadium(III) oxide and a solution of vanadyl sulfate.

While the starting purity of the vanadium pentoxide may be variable, the purity of vanadium pentoxide is preferably at least 90%, preferably at least 98%, preferably at least 99.6%, more preferably at least 99.99%. Vanadium pentoxide may be in a form of a granule or preferably, powder.

The reducing agent may be dissolved in a solvent, such as 2-methoxyethyl ether, tetrahydrofuran, supported on a polymer, such as Amberlyst®, or preferably in the form of a neat solid. As used herein, a solid inorganic reducing agent refers to a reducing agent that is supported on a polymer, or is in the form of a neat solid. The solid inorganic reducing agent specifically excludes the use of hydrogen gas, either pure, or as a mixture, from acting alone as the reducing agent.

The reducing agent can be any solid compound that is capable of releasing hydrogen gas and/or deuterium gas during the reduction of $VO_x$ species, particularly vanadium pentoxide, in which the released gases themselves do not participate in or are not principally involved in the reduction process. In some embodiments, the reducing agent is a compound comprising an aluminum hydride anion and/or an aluminum deuteride anion or a derivative thereof (e.g. $[Al(OtBu)_3H]^-$). In one embodiment, the reducing agent is lithium aluminum hydride. In some embodiments, the reducing agent is a compound comprising a borohydride anion and/or a borodeuteride anion or derivatives thereof (e.g. triacetoxyborohydride and cyanoborohydride). In some embodiments, the borohydride compound may be sodium borohydride, lithium borohydride, sodium cyanoborohydride, potassium borohydride, lithium triethylborohydride, or a combination thereof. In a preferred embodiment, the reducing agent is sodium borohydride. In one embodiment, the purity of sodium borohydride is at least 96%, preferably at least 98%, more preferably at least 99.99%. Sodium borohydride may be in a form of granules, caplets, or preferably powders. The reaction between vanadium pentoxide and sodium borohydride is expressed in a chemical equation (a):

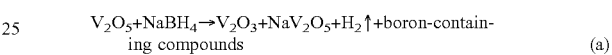

$$V_2O_5 + NaBH_4 \rightarrow V_2O_3 + NaV_2O_5 + H_2\uparrow + \text{boron-containing compounds} \quad (a)$$

A molar ratio of vanadium pentoxide to the total number of hydrogen atoms in the reducing agent ranges from 1:4 to 1:20, preferably 1:8 to 1:12, more preferably, the ratio is about 1:8. In a preferred embodiment, the solid vanadium pentoxide and the solid inorganic reducing agent may be mixed by processes, such as tumbling, milling and grinding, to form a reaction mixture. Preferably, the two reagents are ground with a mortar and pestle. Such grinding may be performed in an inert atmosphere, preferably an argon or nitrogen gas atmosphere. A sufficient amount of a volatile organic solvent, preferably ether, may be added to the reagents to aid homogenization. The volatile organic solvent evaporates during the process, and preferably leaves no residue. In another embodiment, the solid inorganic reducing agent and vanadium pentoxide are milled with a planetary miller. Preferably tungsten carbide balls and tungsten carbide bowls are employed. In one embodiment, a weight ratio of the balls to powders (i.e. the solid inorganic reducing agent and vanadium pentoxide) ranges from 5:1 to 20:1, preferably from 5:1 to 10:1, more preferably from 7:1 to 10:1. In a preferred embodiment, no process control agent is employed in the milling. In one embodiment, the milling is performed in an inert atmosphere, preferably provided by argon gas. A duration of the milling may range from 10-90 minutes, preferably 20-60 minutes, more preferably 30-50 minutes.

The reduction of vanadium pentoxide may occur at elevated temperatures in a reactor such as a furnace (e.g. a tube furnace or a vacuum furnace), a solvothermal autoclave or a hydrothermal autoclave. Preferably, a tube furnace is employed. The reduction occurs in an inert atmosphere, preferably provided by argon. The reaction mixture is heated to a temperature ranging from 300° C. to less than 400° C., preferably 300-350° C., more preferably 300° C. to less than 330° C. In a preferred embodiment, solid sodium borohydride is used, and the reaction mixture is heated to about 300° C. The reaction mixture is heated for at least 10 hours, preferably 10-20 hours, more preferably 10-15 hours, under a pressure ranging from 0.1-10 MPa, preferably 0.1-5 MPa, more preferably 0.1-3 MPa to form a resultant mixture comprising vanadium(III) oxide, sodium vanadium pentoxide, unreacted vanadium pentoxide and boron-containing compounds such as sodium borate and boron oxide.

In one embodiment, the mixing and heating are carried out simultaneously. For example, the powders may be milled in a jacketed drum mill in a miller such as the CM-Simolyer®. The jacketed drum mill may be heated with a hot circulating bath fluid or a heated argon gas. In another embodiment, the powders may be ground in a grinder positioned in the furnace.

An amount of vanadium(III) oxide present in the resultant mixture ranges from 5-50 wt %, preferably 15-50 wt %, more preferably 30-50 wt %, based on the total weight of the resultant mixture. An amount of sodium vanadium pentoxide (comprising vanadium(V) and vanadium(IV)) present in the mixture ranges from 50-95 wt %, preferably 50-85 wt %, more preferably 50-70 wt %, based on the total weight of the mixture. An amount of unreacted vanadium pentoxide present in the mixture ranges from 0.1-20 wt %, preferably 0.1-10 wt %, more preferably 0.1-1 wt %, based on the total weight of the mixture.

In one embodiment, an amount of vanadium(V) may range from 0.1-5 wt %, preferably 0.1-3 wt %, more preferably 0.1-1 wt %, based on a total weight of the vanadium present in the mixture. An amount of vanadium (IV) may range from 50-99 wt %, preferably 50-80 wt %, more preferably 50-70 wt %, based on the total weight of the vanadium present in the mixture. An amount of vanadium (III) may range from 1-50 wt %, preferably 20-50 wt %, more preferably 30-50 wt %, based on the total weight of the vanadium present in the mixture. In a preferred embodiment, a total amount of vanadium(II) and vanadium(0) ranges from 0-0.1 wt %, preferably 0-0.05 wt %, more preferably about 0 wt %, based on the total weight of the vanadium present in the mixture.

The resultant mixture is then mixed with sulfuric acid for at least 4 hours, preferably 4-10 hours, more preferably 4-6 hours to form a suspension comprising a black precipitate, which is vanadium(III) oxide, in a blue solution comprising vanadyl sulfate, boric acid and sodium sulfate. The vanadium(III) oxide may be in the form of particles which are collected by filtering the suspension. Filtration methods are available to those skilled in the art. Preferably, vacuum filtration is employed with a filter paper having a pore size of about 11 μm or a fritted funnel having a pore size in a range of 10-15 μm.

The concentration of sulfuric acid ranges from 6-18 M, preferably 6-12 M, more preferably 6-8 M. The volume of sulfuric acid ranges from 1-10 ml per gram of resultant mixture, preferably 1-8 ml per gram of resultant mixture, more preferably 1-5 ml per gram of resultant mixture. The sulfuric acid may be added to the resultant mixture at a rate ranging from 0.5-5 ml/min, preferably 0.5-4 ml/min, more preferably 0.5-3 ml/min. The mixing process (also known as leaching) may be carried out at atmospheric pressure and at a temperature ranging from 15-100° C., preferably 15-40° C., more preferably 15-30° C. In some embodiments, where the method is carried out on a large scale (i.e. more than 100 g of solid starting material), the mixture may be cooled to a temperature ranging from −20° C. to 10° C., preferably −15° C. to 5° C., more preferably −10° C. to 5° C., prior to mixing with sulfuric acid to minimize the likelihood of runaway reactions due to quenching, for example if excess reducing agent remains. In some embodiments, the mixing process may be carried out by stirring at 50-600 rpm, preferably 100-500 rpm, more preferably 150-400 rpm, or sonicating the mixture.

The concentration of the vanadyl sulfate solution produced may range from 1-20 M, preferably 2-20 M, more preferably 6-10 M.

Figure 2:
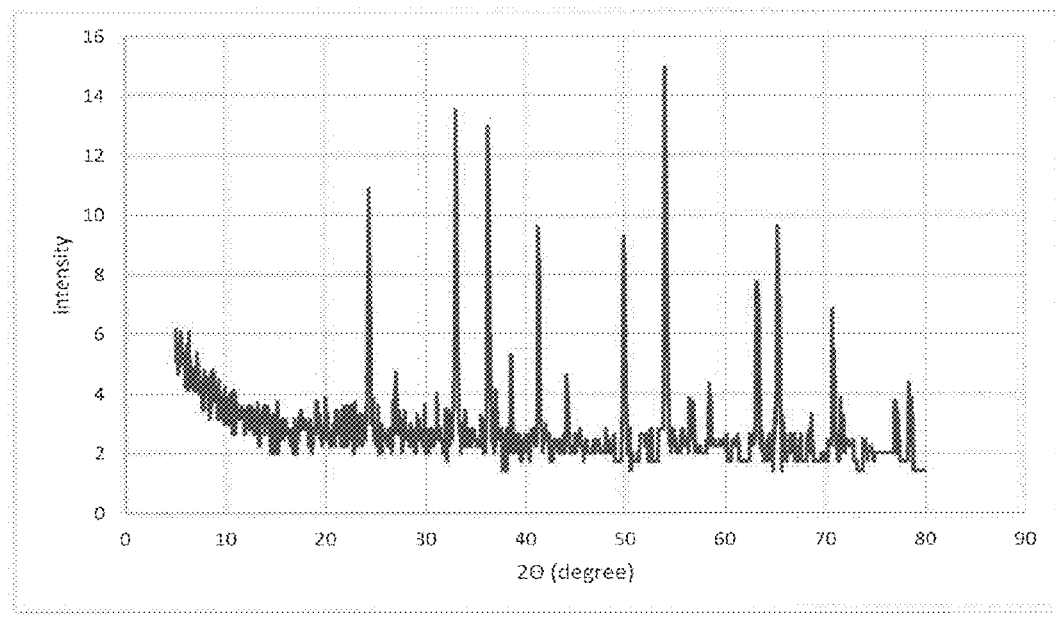
FIG. 2 is a XRD spectrum which indicates the presence of pure crystalline vanadium(III) oxide obtained after filtration as described in the Example.
Figure 3:
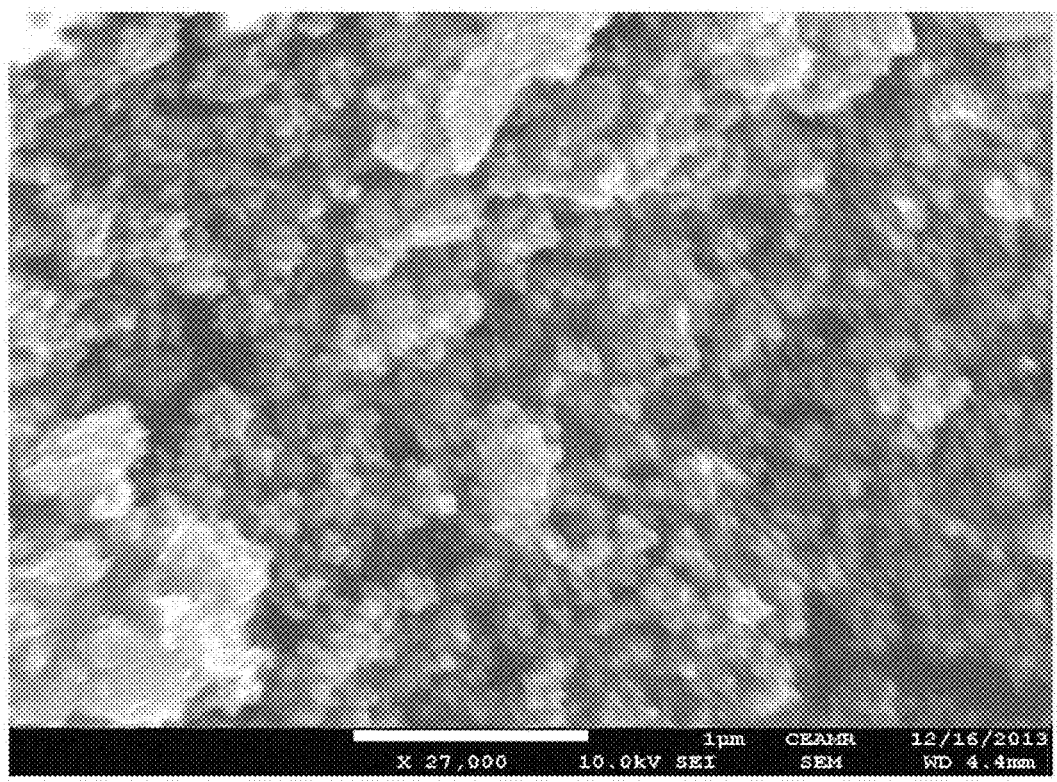
FIG. 3 is a field emission SEM micrograph of a vanadium (III) oxide particle indicating a rough surface.
Figure 4:
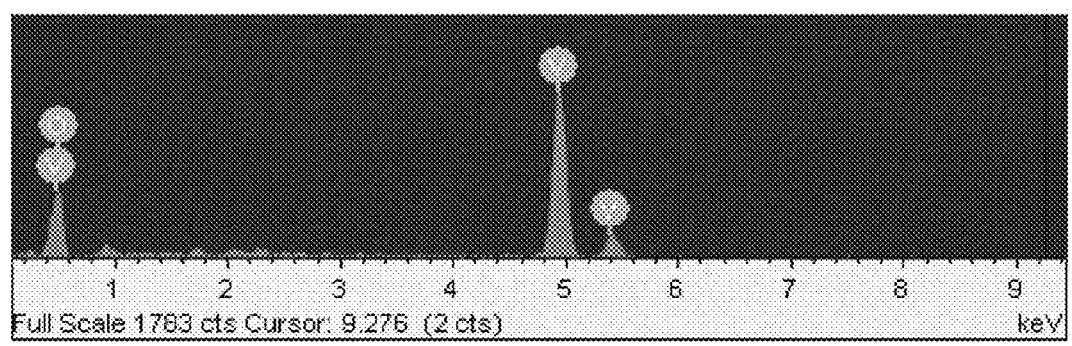
FIG. 4 is an energy dispersive X-ray (EDX) spectrum of vanadium(III) oxide.

The obtained vanadium(III) oxide (also known as vanadium sesquioxide) is crystalline (determined by X-ray powder diffraction, FIG. 2) and highly pure (determined by inductively coupled plasma-mass spectrometry, ICP-MS). The purity of vanadium(III) oxide is at least 95%, preferably at least 98%, more preferably at least 99%. The yield of vanadium(III) oxide ranges from 10-50%, preferably 20-50%, more preferably 30-50%. The obtained vanadium (III) oxide is in the form of a particle with a shape that may be, but is not limited to, a sphere, a spheroid, a polygon etc. Preferably, the vanadium(III) oxide particle has an irregular shape. The vanadium(III) oxide particle may have a diameter (observed from SEM experiments) ranging from 5-100 μm, preferably 10-80 μm, more preferably 20-60 μm. For particles with a polygonal shape, the term "diameter", as used herein, and unless otherwise specified, refers to the greatest possible distance measured from a vertex of a polygon through the center of the face to the vertex on the opposite side. For spheres, spheroids and irregular-shaped particles, "diameter" refers to the greatest possible distance measured from one point on the particle through the center of the particle to a point directly across from it.

The particle may be a cluster of crystals, which leads to a dendritic morphology. As used herein, the term "dendritic morphology" refers to a tree-like structure of crystals and the structure is produced by faster growth along energetically favorable crystallographic directions. The particles may have an average surface roughness, $R_q$, measured by a profilometer, ranging from 3-20 μm, preferably 5-20 μm, more preferably 15-20 μm. The value, $R_q$, is the root mean squared value of the collected surface roughness data points. The size of each crystal may range from 10-500 nm, preferably 50-400 nm, more preferably 80-300 nm.

Transition-metal oxides, such as $Co_3O_4$, $Fe_3O_4$, $Cr_2O_3$, have been employed as the active materials in electrodes of lithium-ion batteries. Compared to these oxides, vanadium (III) oxide offers a higher specific capacity (1070 mAh $g^{-1}$), it has low toxicity and has an abundant material source (Li et al. Journal of the Electrochemical Society, 2004, 151, A1878—incorporated herein by reference in its entirety).

Therefore, in a further embodiment, the present disclosure provides an electrode, preferably a cathode, comprising the vanadium(III) oxide particles, a binder and an electroconductive carbon material. An amount of the vanadium(III) oxide particles ranges from 60-90 wt %, preferably 70-90 wt %, more preferably 75-85 wt %, based on the total weight of the electrode. An amount of the binder ranges from 1-10 wt %, preferably 2-7 wt %, more preferably 4-6 wt %. An amount of the conductive carbon material ranges from 5-30 wt %, preferably 10-20 wt %, more preferably 13-17 wt %.

Suitable binders known to one of ordinary skill which are chemically stable in the potential window of use of the cell may include thermoplastics and thermosetting resins. For example, polyethylene, polypropylene, polytetrafluoroethylene (PTFE), polyvinylidene fluoride (PVDF), styrene butadiene rubber, a tetrafluoroethylene hexafluoro ethylenic copolymer, a tetrafluoroethylene hexafluoropropylene copolymer (FEP), a tetrafluoroethylene perfluoroalkyl vinyl ether copolymer (PFA), ethylene-tetrafluoroethylene copolymer (ETFE resin), polychlorotrifluoroethylene resin (PCTFE), a propylene-tetrafluoroethylene copolymer, an ethylene-chlorotrifluoroethylene copolymer (ECTFE) and an ethylene-acrylic acid copolymer. These binders may be used independently, or mixtures may be used.

Non-limiting examples of electroconductive carbon material include carbon black, such as Ketjen black, Super P, Super C65, Ensaco black and acetylene black, vapor grown carbon fiber, graphene, natural graphite, artificial graphite, such as Timrex SFG-6, Timrex SFG-15, Timrex SFG-44, Timrex KS-6, Timrex KS-15 and Timrex KS-44, fullerenes, hard carbon, mesocarbon microbeads and activated carbon. The electroconductive carbon material may be commercially available or prepared in-house. In one embodiment, graphene may be prepared by a solvothermal method (Choucair et al. Nature Nanotechnology, 2008, 4, 30—incorporated herein by reference in its entirety). In a further embodiment, vanadium(III) oxide particles may be added to the solvothermal reaction to form a composite comprising vanadium(III) oxide and the electroconductive carbon material. An amount of vanadium(III) oxide in the composite ranges from 50-99.9 wt %, preferably 80-99.9 wt %, more preferably 95-99.9 wt %, based on the total weight of the composite. The weight of the electroconductive carbon material ranges from 0.1-50 wt %, preferably 0.1-20 wt %, more preferably 0.1-5 wt %, based on the total weight of the composite.

The electrode may be prepared by mixing the vanadium (III) oxide particles and/or the composite according to the above description with one or more binders and other materials conventionally employed to prepare an electrode structure. These materials may be mixed as a slurry, coated onto a metal foil, and dried. The methods of construction of an electrode employing an active material are conventionally known and any such method that is compatible with the particles of the disclosure may be employed.

The components may be wet blended in the presence of a suitable solvent or dry blended using a mortar or other conventionally known mixing equipment. The mixture may then be applied to a charge collector by conventionally known methods such as employing a roll coater. A comma bar coater or a slot die coater may be employed. Preferably, a slot die coater is employed. Any suitable charge collector may be employed. Preferred charge collectors may be any of carbon, stainless steel, nickel, aluminum and copper.

The cathode thus prepared may be employed in the construction of an electrochemical cell or battery in a conventionally known manner. In a preferred embodiment the cathode may be combined with an anode having lithium as an active material.

Thus, the present disclosure provides a battery comprising a lithium anode and a cathode comprising the vanadium(III) oxide particles according to the present disclosure.

Nonaqueous solvents suitable as an electrolyte include cyclic carbonates, chain carbonates, cyclic esters, cyclic ethers and chain ethers. Examples of a cyclic carbonate include ethylene carbonate, propylene carbonate, butylene carbonate and vinylene carbonate. Examples of a chain carbonate include dimethyl carbonate, diethyl carbonate and methyl ethyl carbonate. Examples of a cyclic ester carbonate include gamma butyrolactone and gamma valerolactone. Examples of a cyclic ether include tetrahydrofuran and 2-methyltetrahydrofuran. Examples of a chain ether include dimethoxyethane and ethyleneglycol dimethyl ether.

The lithium electrolyte ion or mobile ion carrier may be any conventionally known to one of skill in the art and may include one or more of $LiPF_6$, $LiClO_4$, $LiAsF_6$, $LiBF_4$, $LiN(CF_3SO_2)_2$, $Li(CF_3SO_3)$ and $LiN(C_2F_5SO_2)_2$.

Having generally described this disclosure, a further understanding can be obtained by reference to certain specific examples which are provided herein for purposes of illustration only and are not intended to be limiting unless otherwise specified.

Example 9.1 g vanadium pentoxide (50 mmole) is mixed with 3.78 g (100 mmole) sodium borohydride ($NaBH_4$) and placed in a porcelain crucible. A solid state reaction was carried out in a reactor at 300° C. under argon atmosphere (99.999% purity) for 10 hours. The resultant mixture contains unreacted vanadium pentoxide, vanadium(III) oxide, sodium borate and sodium vanadium pentoxide. The mixture is placed in a beaker and leached with sulfuric acid for 4 hours. The black precipitate, high purity crystalline vanadium(III) oxide, is filtered and dried at 150° C. The blue filtrate contains vanadyl sulfate and boric acid.

The invention claimed is:

1. A method for producing vanadium trioxide, comprising:
   reacting solid vanadium pentoxide with a solid inorganic reducing agent to form a mixture;
   mixing sulfuric acid with the mixture to form a suspension comprising vanadium trioxide and vanadyl sulfate; and
   filtering the suspension to obtain solid vanadium trioxide and a solution of vanadyl sulfate.

2. The method of claim 1, wherein the solid vanadium pentoxide and the solid inorganic reducing agent are reacted in the absence of solvent.

3. The method of claim 1, wherein the reacting comprises heating for 10-20 hours at a temperature ranging from 300° C. to less than 400° C.

4. The method of claim 3, wherein the reacting comprises heating for 10 hours at a temperature ranging from 300° C. to less than 330° C.

5. The method of claim 1, wherein the reacting comprises mixing the solid vanadium pentoxide with the solid inorganic reducing agent, followed by heating for 10-20 hours at a temperature ranging from 300° C. to less than 400° C.

6. The method of claim 1, wherein the solid inorganic reducing agent comprises a borohydride anion or a derivative thereof.

7. The method of claim 1, wherein the solid inorganic reducing agent is at least one of sodium borohydride and potassium borohydride.

8. The method of claim 1, wherein the solid inorganic reducing agent is sodium borohydride.

9. The method of claim 1, wherein a molar ratio of vanadium pentoxide to a total number of hydrogen atoms in the solid inorganic reducing agent ranges from 1:4 to 1:20.

10. The method of claim 1, wherein a molar ratio of vanadium pentoxide to a total number of hydrogen atoms in the solid inorganic reducing agent is about 1:8.

11. The method of claim 1, wherein the sulfuric acid has a concentration ranging from 6-18 M.

12. The method of claim 1, wherein the mixing is carried out at a temperature ranging from 15-30° C.

13. The method of claim 1, wherein the sulfuric acid and the mixture are mixed by sonication or stirring.

14. The method of claim 1, further comprising cooling the mixture to a temperature ranging from −10° C. to 5° C. prior to the mixing to form a cooled mixture.

15. The method of claim 1, further comprising allowing the suspension to stand for 4-10 hours prior to the filtering.

16. The method of claim 1, which produces solid vanadium trioxide with a purity of at least 95%.

17. A method for producing vanadium trioxide, comprising:
- reacting solid vanadium pentoxide with a solid inorganic reducing agent comprising a borohydride anion or a derivative thereof to form a mixture, wherein the solid inorganic reducing agent is supported on a polymer or is in the form of a neat solid;
- mixing sulfuric acid with the mixture to form a suspension comprising vanadium trioxide and vanadyl sulfate; and
- filtering the suspension to obtain solid vanadium trioxide and a solution of vanadyl sulfate.

18. A method for making an electrode, comprising:
- reacting solid vanadium pentoxide with a solid inorganic reducing agent to form a mixture;
- mixing sulfuric acid with the mixture to form a suspension comprising vanadium(III) oxide and vanadyl sulfate;
- filtering the suspension to obtain solid vanadium(III) oxide and a solution of vanadyl sulfate;
- mixing the solid vanadium(III) oxide with a polymer and an electroconductive carbon material to form a slurry;
- applying the slurry as a coating onto a metal foil; and
- drying the coating to form the electrode.

19. The method of claim 18, wherein the slurry is applied on the metal foil with a roll coater.

* * * * *